United States Patent

Mischenko

[11] Patent Number: 6,065,187
[45] Date of Patent: May 23, 2000

[54] HINGE ASSEMBLY

[75] Inventor: Nicholas Mischenko, Mt. Prospect, Ill.

[73] Assignee: Motorola, Inc., Schaumburg, Ill.

[21] Appl. No.: 09/078,907

[22] Filed: May 14, 1998

[51] Int. Cl.[7] .................................................. E05D 11/08
[52] U.S. Cl. ................................ 16/341; 16/303; 16/386; 379/433
[58] Field of Search ............................. 16/256, 318, 277, 16/303, 341, 386; 379/433

[56] References Cited

U.S. PATENT DOCUMENTS

| | | | |
|---|---|---|---|
| 3,975,794 | 8/1976 | Kaiser et al. | 16/303 |
| 5,138,743 | 8/1992 | Hoffman | 16/303 |
| 5,165,145 | 11/1992 | Sherman | 16/303 |
| 5,274,882 | 1/1994 | Persson | 16/229 |
| 5,628,089 | 5/1997 | Wilcox et al. | 16/303 |
| 5,682,644 | 11/1997 | Bohacik et al. | 16/303 |
| 5,724,683 | 3/1998 | Sorimachi et al. | 16/303 |
| 5,848,152 | 12/1998 | Slipy et al. | 379/433 |
| 5,933,330 | 8/1999 | Beutler et al. | 379/433 |
| 5,966,776 | 10/1999 | Ona | 16/303 |

FOREIGN PATENT DOCUMENTS

| | | | |
|---|---|---|---|
| 0 445 559 A1 | 11/1991 | European Pat. Off. | 16/341 |
| 10-252739 | 9/1998 | Japan | 16/341 |
| 10-311327 | 11/1998 | Japan | 16/341 |
| WO 93/18592 | 9/1993 | WIPO . | |

*Primary Examiner*—Anthony Knight
*Assistant Examiner*—Donald M. Gurley
*Attorney, Agent, or Firm*—Lalita P. Williams

[57] ABSTRACT

A hinge assembly (2800) for a wireless communication device (100) having a body (104), and a cover (102) including a barrel (216) integrally formed thereon. The hinge assembly (2800) includes a follower (2802), a cam (2804) coupled to the follower (2802) and a spring (2806) coupled to the cam (2804) and coiled around a segment of the follower (2802). The hinge components can be fully assembled and self contained apart from manufacture of the wireless communication device (100).

14 Claims, 4 Drawing Sheets

HINGE ASSEMBLY

FIELD OF THE INVENTION

The present invention relates generally to apparatus for hinging the housing of a foldable, portable wireless communication device. Although the invention is subject to a varied range of applications, it is especially suited for use in a handheld radiotelephone, and will be particularly described in that connection.

BACKGROUND OF THE INVENTION

Portable radiotelephones are increasingly utilized to permit a user to communicate telephonically over a wireless system at virtually any location. The portable telephone transmits a low wattage, radio frequency signal to a receiving station, which may be connected with conventional landline telephone systems.

Portable radiotelephones having two housings joined by a type of hinge that allows the housings to fold upon one another are known in the art. Some such folding radiotelephones have most of the electronics in one housing called the main housing and fewer electronics in the other housing, called the cover. Other such folding radiotelephones have all the electronics in the body with the cover serving only to cover the keypad or keypad and display of the phone.

Some known portable cellular radiotelephones utilize, as shown in FIG. 6, a hinge mechanism having a spring 642 and hinge pins 636, 648 disposed in a tubular hinge arm 624 formed at an end of a cover 606, and bushings 660 formed in body 612. Spring 642 is positioned between hinge pins 636, 648, and at all times outwardly forces hinge pins 636, 648 from cover 606 to body 612. Examples of such known radiotelephones are described in PCT Publication No. WP 93/18592, published Sep. 16, 1993 and U.S. Pat. No. 5,274,882, issued Jan. 4, 1994.

Although suitable for some foldable radiotelephones, such a hinge mechanism as described above is not suitable for miniaturized foldable radiotelephones. The housings of the miniaturized radiotelephones do not have sufficient bulk and material strength to bear the spring's outwardly directed compressive forces. Also, the smaller housing makes it more difficult to assemble the hinge elements.

U.S. Pat. No. 5,628,089 by Wilcox et al., entitled "Radiotelephone Having a Self Contained Hinge," issued May 13, 1997, and assigned to Motorola, Inc. discloses a hinge for use in a miniaturized radiotelephone. The hinge 301 comprises a spring 405, a cam 404 and a follower 403 assembled into a cylindrically hollow can 303 via an open end thereof and held in assemblage by a cap 305 coupled to the can 303 over the open end. The assembled hinge 301 in can 303 is disposed in a cavity 307 of cover 103 and a cavity 503 of body 101. The self contained hinge may be desirable to some radiotelephone manufacturers because it can be purchased as a separate unit, thereby eliminating the steps associated with assembling the hinge during manufacturing. However, because the hinge includes a can to hold the hinge components together, the number of parts used and the cost of the hinge is increased.

Thus, a need exists for a self contained hinge for use in a miniaturized foldable device, such as a portable radiotelephone, that minimizes the number of parts and cost of the hinge.

SUMMARY OF THE PREFERRED EMBODIMENT

The present invention provides a hinge assembly for a miniaturized wireless communication device, such as a portable radiotelephone. In the preferred embodiment, the hinge assembly includes a follower; a cam rotatably coupled to the follower; and a spring coupled on one end to the cam and coiled around a segment of the follower.

The hinge configuration of the present invention eliminates a separate housing for holding the hinge components in assemblage, thereby decreasing the cost and complexity of the hinge. Additional advantages and novel features of the invention will be set forth in part in the description which follows, wherein the preferred embodiment of the invention is shown and described. Reference will now be made in detail to an embodiment configured according to the present invention.

DESCRIPTION OF THE PREFERRED EMBODIMENT

The following detailed description is exemplary and explanatory only and is not restrictive of the invention as claimed. The accompanying drawings illustrate the preferred embodiment of the invention and together with the description serve to explain the principles of the invention. Reference will now be made in detail to the present preferred embodiment of the invention.

Figure 1:
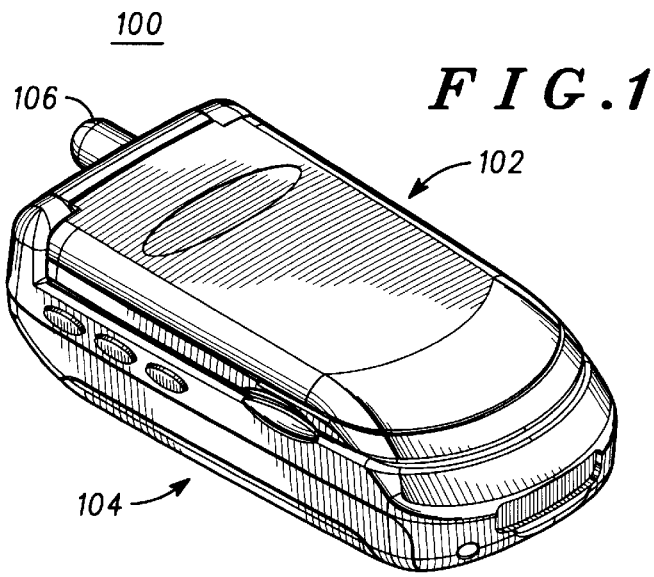
FIG. 1 is a perspective view of a foldable radiotelephone in a closed position configured in accordance with the present invention.
Figure 2:
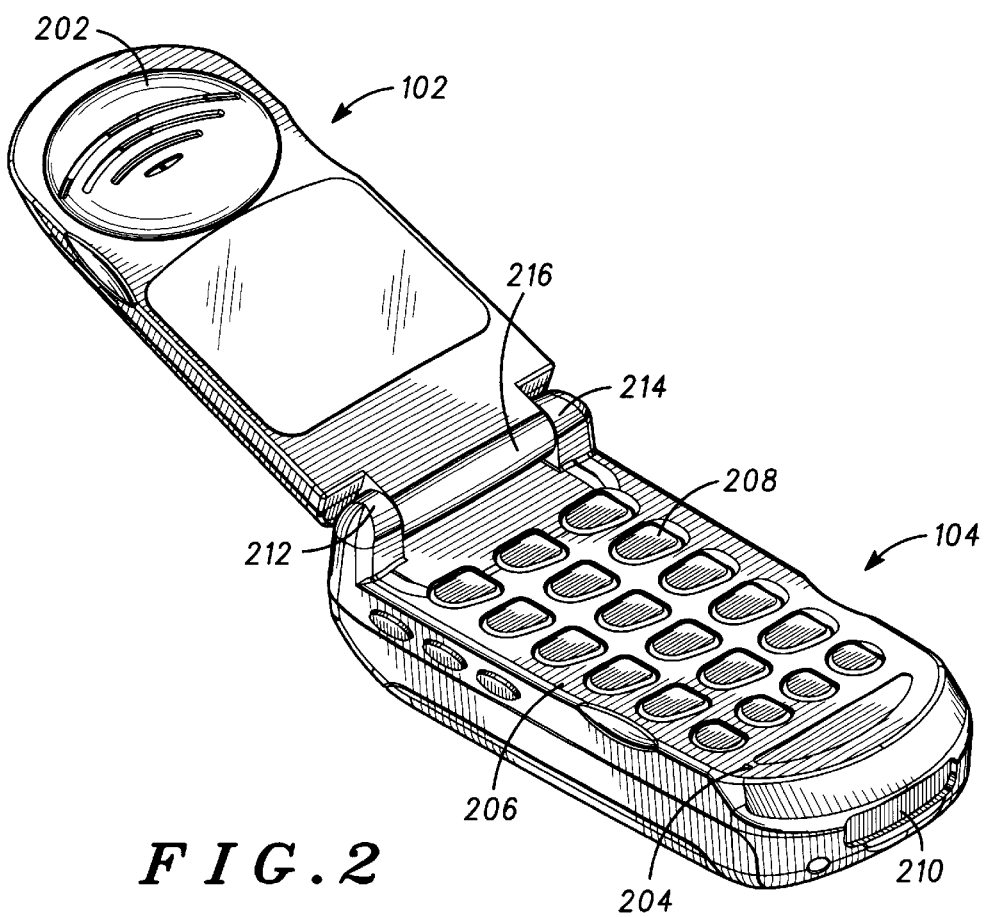
FIG. 2 is a perspective view of the foldable radiotelephone shown in FIG. 1 in an open position configured in accordance with the present invention.

The exemplary embodiment of a foldable, portable radiotelephone 100 which embodies the present invention is shown in FIGS. 1 and 2. The portable radiotelephone includes two portions, a cover 102 and a body 104. The drawing of FIG. 2 shows cover 102 in an "open" position such that a user of the radiotelephone 100 can listen via earpiece 202 and speak into microphone 204. The body includes a keypad 206 having a plurality of buttons 208 numbered one through zero, #, and * in a familiar telephone arrangement. The keypad 206 may also have additional buttons 208 such as power, function, send, and other buttons associated with telephone number recall. The body 104 also has an antenna 106 (FIG. 1) that enables wireless communication between radiotelephone 100 and a base station (not shown) of the cellular radiotelephone system. The body 104 further includes a port 210 that allows radiotelephone 100 to connect with peripheral components, for example, a battery charger and external antenna, keypad, speaker or microphone.

Figure 3:
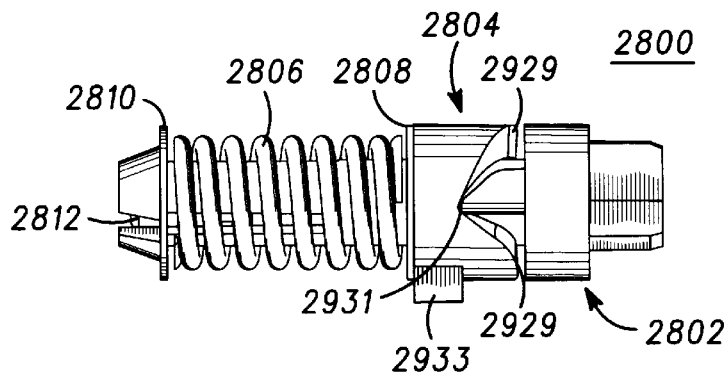
FIG. 3 is an elevational view of an assembled hinge configured in accordance with the present invention.

As embodied herein and referring to FIG. 3, a hinge assembly 2800 joins cover 102 to body 104 (FIG. 1). Hinge 2800, which is described in detail below, is shown fully assembled in the elevational view of FIG. 3 and exploded in the perspective view of FIG. 4. FIG. 5, which shows a cross sectional view of the radiotelephone 100 of FIG. 1 in the closed position, illustrates the coupling of the assembled hinge 2800. When the radiotelephone is assembled, the hinge 2800 is disposed in a barrel portion 216 of cover 102. The cover 102, with hinge 2800 received therein, is rotatably coupled between two knuckles 212, 214 (FIG. 2) of body 104. The design of hinge 2800 allows cover 102 to be held against keypad 206 in the closed position, as shown in FIG. 1 and at an obtuse angle in the open position, as shown in FIG. 2.

An advantage of the preferred embodiment of the present invention is that the elements can be assembled independently of the radiotelephone housings. After assembly of hinge 2800, the assembled components, rather than the individual components, can be handled by assemblers when disposing hinge 2800 in the radiotelephone 100. Also, unlike the hinge assembly disclosed in U.S. Pat. No. 5,628,089, the hinge assembly 2800 of the present invention does not include a separate element for keeping the hinge components together.

The details of the hinge assembly 2800 are now described. Referring to FIG. 3, the hinge assembly 2800 includes a stationary element, such as a follower 2802, two moveable elements, such as a cam 2804 and a spring 2806, two friction washers 2808, 2810 and a rod 2812 held in engagement to provide a self contained hinge assembly 2800.

Figure 4:
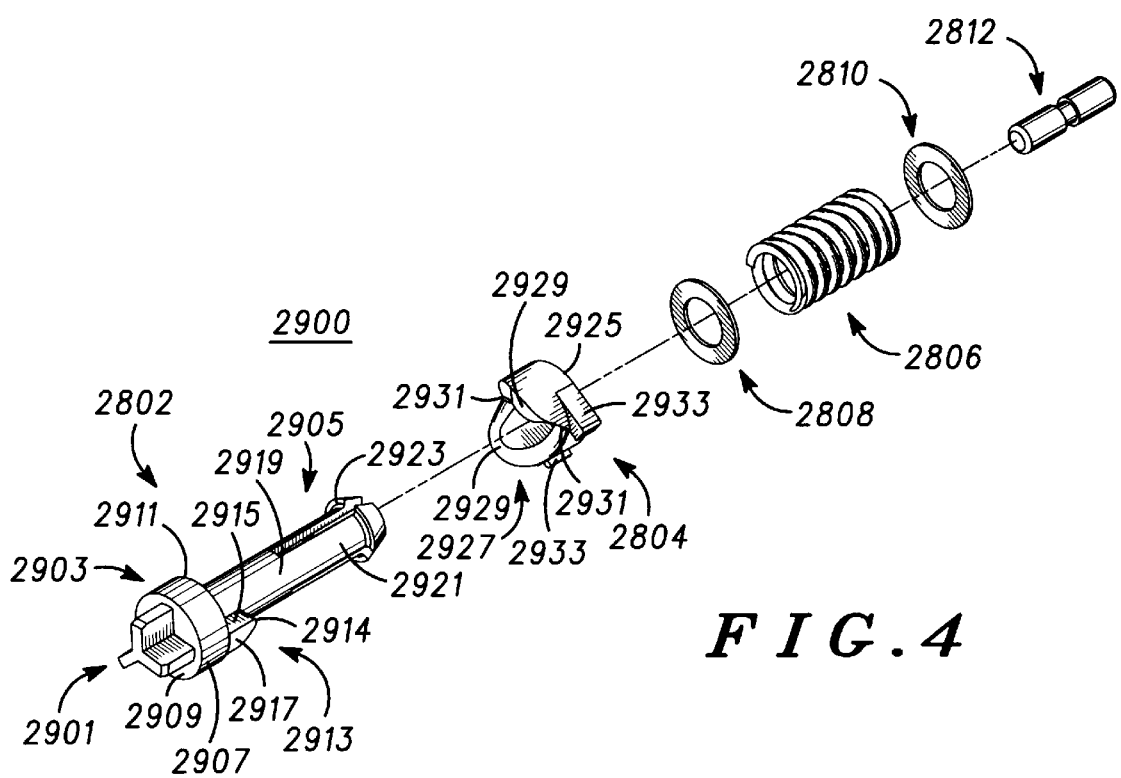
FIG. 4 is an exploded view of the hinge assembly shown in FIG. 3.
Figure 5:
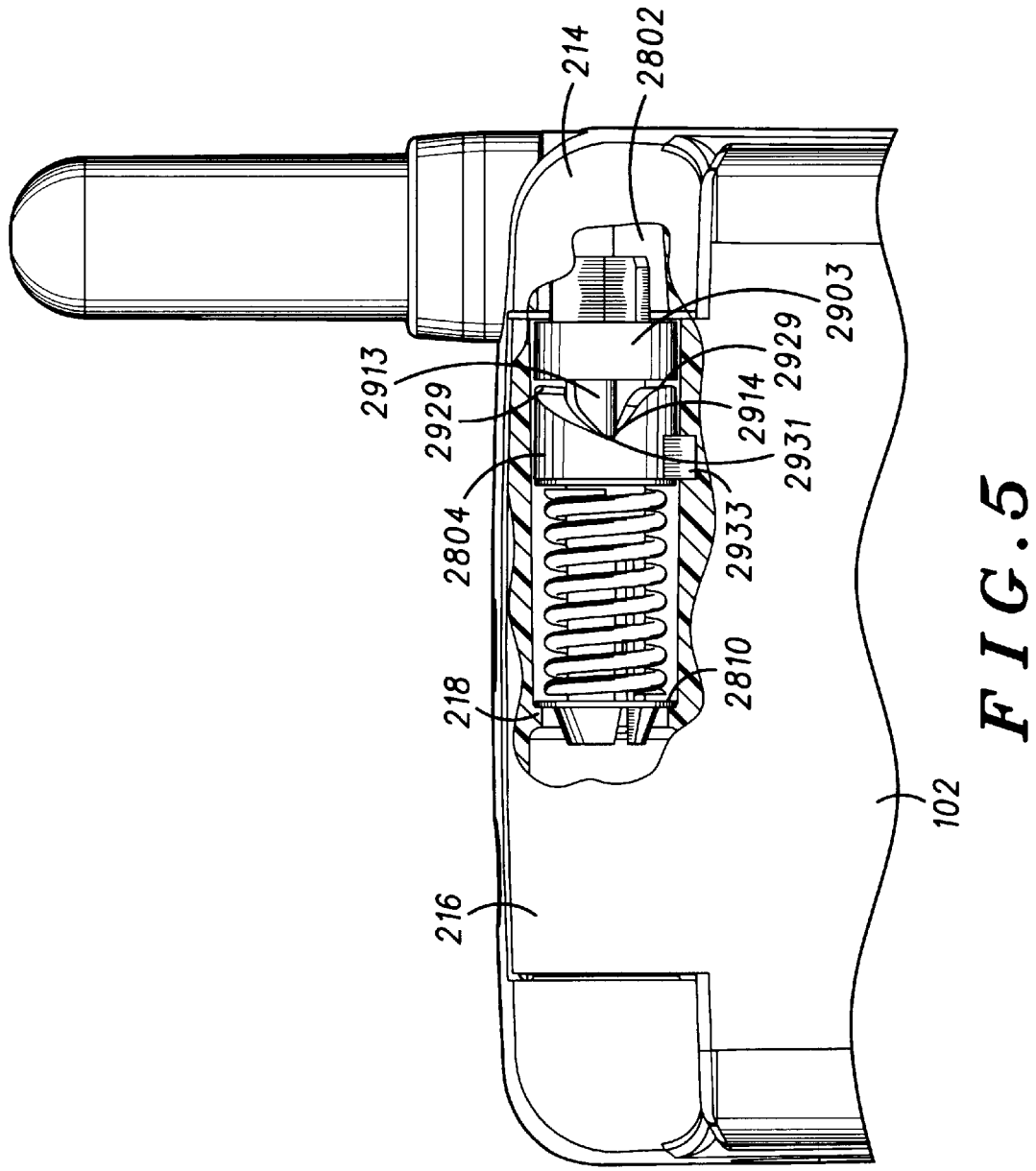
FIG. 5 is a cross sectional view of the radiotelephone illustrated in FIG. 1, taken along its rotating axis.
Figure 6:
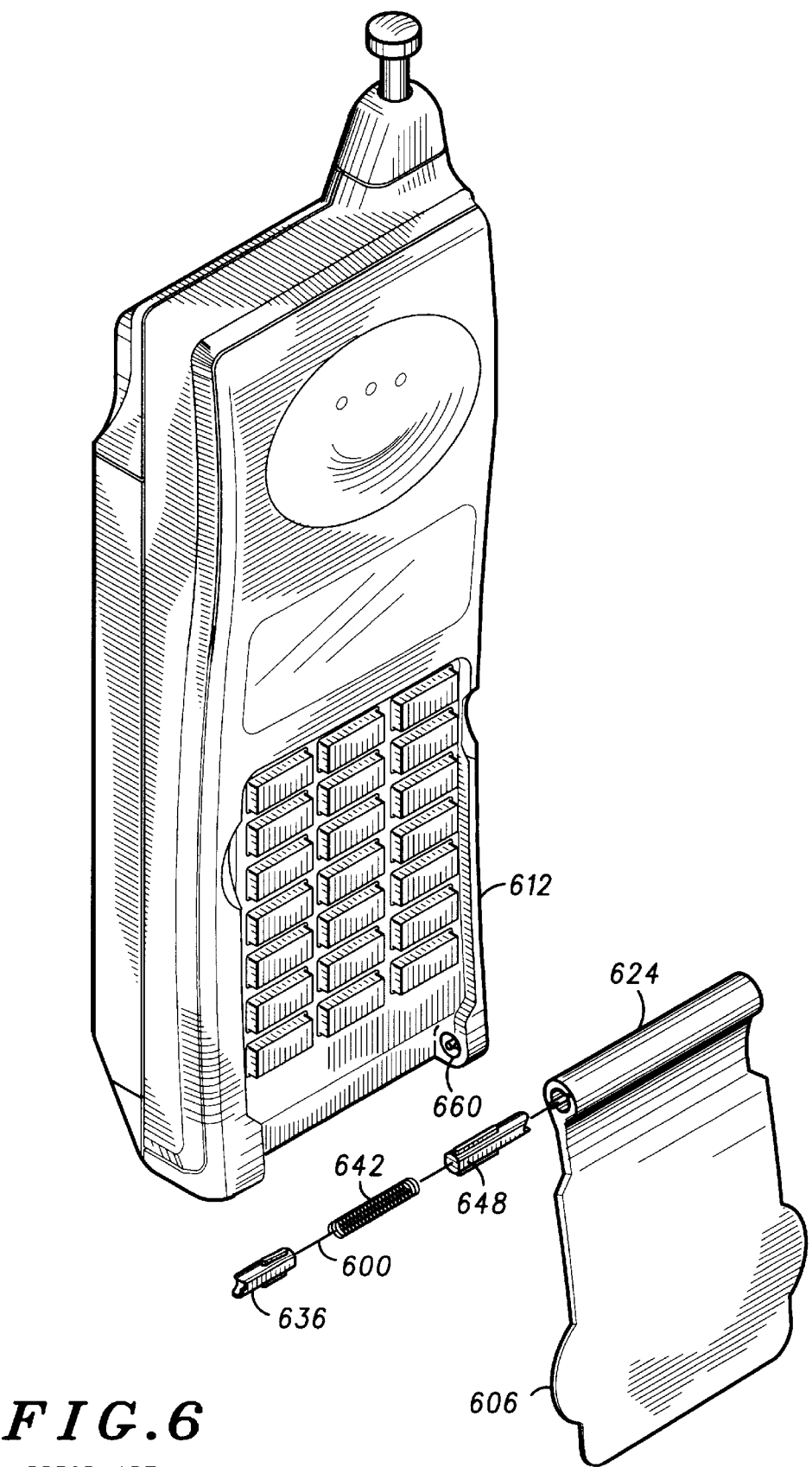
FIG. 6 is an exploded, perspective view of a known radiotelephone.

Referring to FIG. 4, an exploded left perspective view of the preferred embodiment of the hinge assembly 2800 is shown. The follower 2802 includes three integrally formed portions: a connector 2901, preferably Y-shape or other suitable shape, a body 2903 and a shaft 2905. Preferably, the follower 2802 is injection molded using an acetal resin or Teflon material commercially available from many sources. The Y-shape connector 2901 mates with an aperature (not shown) in one of the knuckles 212, 214 of the radiotelephone body 104. The aperature is shaped to received the Y-shape connector 2901 and lock the hinge assembly in place.

The follower body 2903 is formed of a cylindrical portion 2907 having a flat bottom surface 2909 and a flat top surface 2911. Coupled to the top surface 2911 of the follower body 2903 are a plurality of tabs 2913, preferably two (only one shown). The tabs 2913 have a flat first surface 2915 and a curved second surface 2917. In the preferred embodiment, the tabs 2913 are spaced 180 degrees from one another. Also coupled to the top surface 2911 of the follower body 2903 and received between the tabs 2913 is a tubular-shaped shaft 2905.

The shaft 2905 preferably includes a solid portion 2919 and a portion comprised of a plurality of equally spaced spring retaining prongs 2921 arranged in a circular manner. The number of spring retaining prongs 2921 is preferably three. Each prong 2921 preferably forms a lip 2923 at an end of the prong. To ensure that the outer diameter of the shaft 2905 is slightly less than the inner diameter of the spring 2806, a rod 2812 is received between the prongs 2921 such that an inner surface of each prong is pressed firmly against the rod 2812. The rod is preferably made of ABS.

The cam 2804 is preferably injection molded using a Teflon filled resin material commercially available from many sources, and is generally cylindrically shaped and hollow. One end of the cam 2804 forms a flat ring surface 2925. The other end of the cam 2804 is shaped with a profile 2927 having peaks 2929 and valleys 2931 (also illustrated in FIG. 3) to mate with the top surface 2911 of the follower body 2903. During assembly of the hinge components, the profile end 2927 of the cam 2804 is inserted over the follower shaft 2905 and mates with the top surface 2911 of the follower body 2903 such that the follower tabs 2913 are received in the valleys 2931 of the cam 2804 as shown in FIG. 3.

The cam 2804 also includes a plurality of ribs 2933. The ribs 2933 are received in slots (not shown) formed on the interior surface of the barrel portion 216 of the cover 102 so that the cam 2804 rotates with the radiotelephone cover 102 as the cover 102 is moved between the open and closed positions with respect to the radiotelephone body 104. Because the follower connector 2901 is locked into one of the knuckles 212, 214 of the radiotelephone body 104, the follower 2802 does not rotate when the cover 102 is moved between the open and closed positions.

The spring 2806 is composed of metal and is spiral shaped. During assembly of the hinge components, the spring 2806 is placed over the follower shaft 2905 and coupled between the cam 2804 and the lips 2923 of the spring retaining prongs 2921 of the follower shaft 2905. In the preferred embodiment, a first friction washer 2808 is disposed between the flat ring surface 2925 of the cam 2804 and one, end of the spring 2806 and a second friction washer 2810 is disposed between the other end of the spring 2806 and the lips 2923 of the spring retaining prongs 2921. The friction washers 2808, 2810 minimize the wear and tear on the cam 2804 and spring retaining prongs 2921 during rotation of the radiotelephone cover 102 between the open and closed positions.

Once the individual hinge components are assembled as described above, the assembly 2800 provides a self-contained component that can be sold as an off the shelf component or directly incorporated into a radiotelephone during manufacture. If incorporated into the phone during manufacture, the hinge assembly 2800, as shown in FIG. 5, is disposed inside the barrel portion 216 of the radiotelephone cover 102. As illustrated, the follower connector 2901 is received in one of the phone body's knuckles 214 and is locked therein to prevent rotation of the follower 2802 as the phone cover 102 is opened and closed. At the opposite end of the follower, the second friction washer 2810 abuts a retaining shoulder 218 formed in the interior of the barrel 216. As mentioned previously, the ribs 2933 formed on the outer surface of the cam 2804 are received in grooves (not shown) in the interior of the barrel 216 so that the cam 2804 rotates with the cover 102 as it is opened and closed. As the cover 102 is rotated between the open and closed positions, the cam 2804 rotates about the follower body 2903 180 degrees such that each tab 2913 (only one shown) of the follower body 2903 is repositioned from one valley 2931 (or detent position) of the cam 2804 to an adjacent valley 2931 (detent position) of the cam 2804. When the cover 102 is moved from the open position to the closed position, rotation of the cam peaks 2929 past the tips 2914 of the tabs 2913 cause the cover 102 to spring closed. Likewise, when the cover 102 is moved from the closed position to the open position, rotation of the cam peaks 2929 in the opposite direction past the tips 2914 of the tabs 2913 causes the cover 102 to spring open. This feature enables the cover 102 to be easily opened and closed.

Those skilled in the art will recognize that various modifications and variations can be made in the apparatus of the present invention and in construction of this apparatus without departing from the scope or spirit of this invention.

What is claimed is:

1. A hinge assembly comprising:
   a follower having an integrally formed connector, a body, at least one tab and an elongated shaft, wherein the shaft comprises a solid portion and a hollow portion defining a plurality of spring retaining prongs;

a cam rotatably and longitudinally slidably coupled to the shaft of the follower and comprising a cam surface cooperating with the at least one tab, and at least one externally projecting rib; and a spring coupled on one end to the cam and coiled around the elongated shaft of the follower between the cam and the spring retaining prongs.

2. The hinge assembly of claim 1 wherein the connector forms a Y-shape protrusion.

3. The hinge assembly of claim 1 wherein the follower body comprises a cylindrical portion having a flat bottom surface and a top surface having a plurality of tabs fixedly coupled thereto.

4. The hinge assembly of claim 3 wherein the plurality of tabs is 2.

5. The hinge assembly of claim 3 wherein each of the plurality of tabs forms a linear surface and a curved surface.

6. The hinge assembly of claim 1 further comprising a first friction washer encircling the follower and disposed between the cam and a first end of the spring.

7. The hinge assembly of claim 6 further comprising a second friction washer encircling the follower and coupled to a second end of the spring.

8. In a wireless communication device having a body and a cover, a hinge assembly comprising:

a follower having an integrally formed connector, a body, at least one tab and an elongated shaft, wherein the shaft comprises a solid portion and a hollow portion defining a plurality of spring retaining prongs;

a cam having a flat ring surface and a surface shaped with a profile having peaks and valleys cooperating with the at least one tab, the cam rotatably and longitudinally slidably coupled to the shaft of the follower and having at least one externally projecting rib; and a spring coupled on one end to the cam and coiled around the elongated shaft of the follower between the cam and the spring retaining prongs.

9. The wireless communication device of claim 8 wherein the body of the follower forms a flat ring surface having a plurality of tabs integrally formed thereon.

10. The wireless communication device of claim 9 wherein rotation of the cover from an open position to a closed position with respect to the device body causes the cam to rotate about the follower such that the peaks of the cam travel past the tips of the tabs thereby causing the cover to spring closed.

11. The wireless communication device of claim 9 wherein rotation of the cover from a closed position to an open position with respect to the device body causes the cam to rotate about the follower such that the peaks of the cam travel past the tips of the tabs thereby causing the cover to spring open.

12. The wireless communication device of claim 9 wherein rotation of the cover between an open position and a closed position with respect to the device body causes the cam to rotate such that the tabs of the follower are moved from one detent position of the cam to an adjacent detent position of the cam.

13. A radiotelephone including a body, a cover and a hinge assembly coupled to the body and cover for joining the body and cover, the hinge assembly comprising:

a follower having an integrally formed connector, a body, at least one tab and an elongated shaft, wherein the shaft comprises a solid portion and a hollow portion defining a plurality of spring retaining prongs;

a cam having a flat ring surface, a surface shaped with a profile having peaks and valleys, for cooperating with the at least one tab, and having at least one externally projecting rib the cam rotatably and longitudinally slidably coupled to the shaft of the follower; and a spring coupled on one end to the cam and coiled around the elongated shaft of the follower between the cam and the plurality of spring retaining prongs.

14. A hinge assembly comprising:

a follower having a connector, a body, at least one tab and an elongated shaft, wherein the shaft comprises a solid portion and a hollow portion defining a plurality of spring retaining prongs each forming a lip at an end of the prong:

a cam rotatably and slidably coupled to the follower for cooperating with the at least one tab and having a radially extending rib; and a spring coupled on one end to the cam and coiled around a segment of the follower between the cam and the lip.

\* \* \* \* \*

UNITED STATES PATENT AND TRADEMARK OFFICE
CERTIFICATE OF CORRECTION

PATENT NO.   : 6,065,187  
DATED        : May 23, 2000  
INVENTOR(S)  : Mischenko, Nicholas Page 1 of 1

It is certified that error appears in the above-identified patent and that said Letters Patent is hereby corrected as shown below:

<u>Claims 14,</u>
Line 11: Please insert "s" after lip

Signed and Sealed this

Thirty-first Day of July, 2001

*Attest:*

NICHOLAS P. GODICI  
*Attesting Officer*  *Acting Director of the United States Patent and Trademark Office*